Feb. 4, 1964  L. S. FITE  3,120,395
TRUCK BED ATTACHMENT
Filed July 6, 1961  2 Sheets-Sheet 1
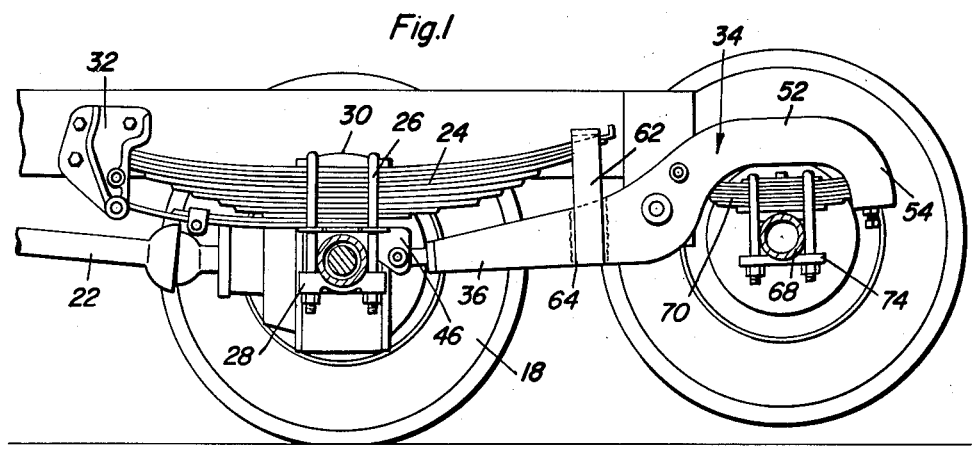
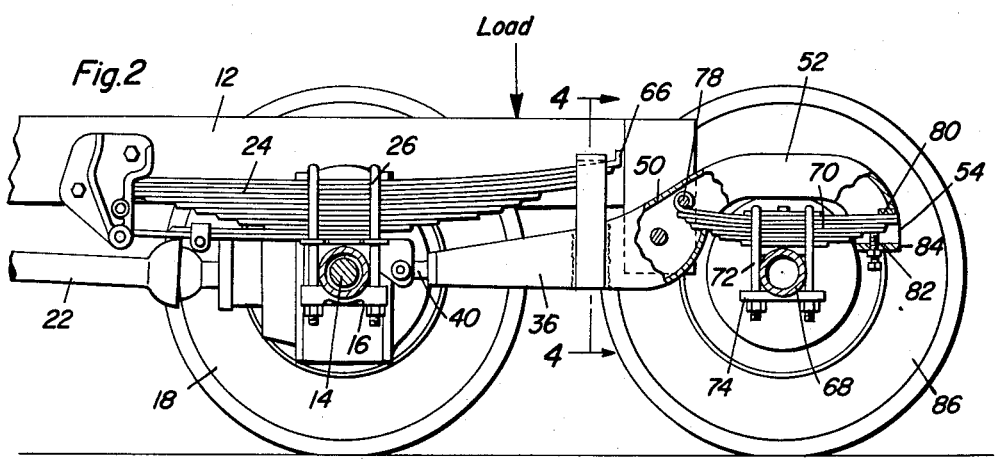
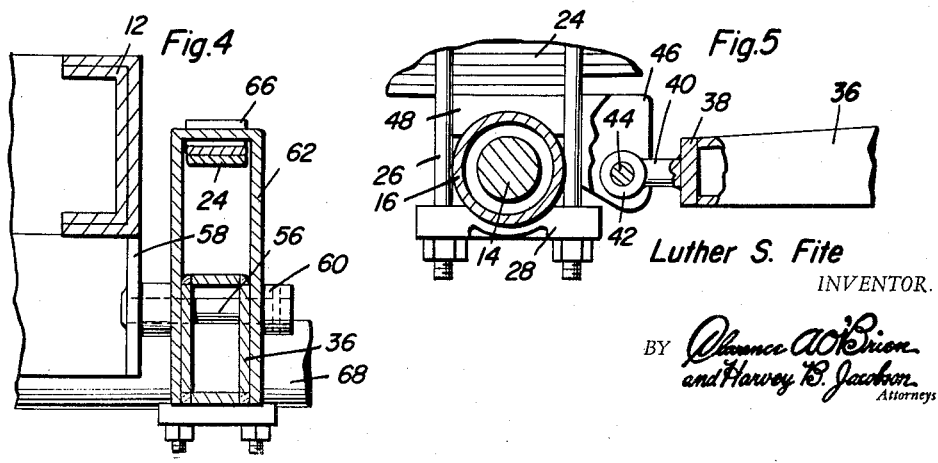
Luther S. Fite
INVENTOR.

Feb. 4, 1964 L. S. FITE 3,120,395
TRUCK BED ATTACHMENT
Filed July 6, 1961 2 Sheets-Sheet 2

Luther S. Fite
INVENTOR.

United States Patent Office 3,120,395
Patented Feb. 4, 1964

3,120,395
TRUCK BED ATTACHMENT
Luther S. Fite, 202 Kelly Ave., Natchez, Miss.
Filed July 6, 1961, Ser. No. 122,159
4 Claims. (Cl. 280—104.5)

The present invention generally relates to an attachment for truck beds and the like in the form of an elevatable tandem wheel assembly which enables the load to be distributed over a greater number of axles and wheels than is employed when the truck is unloaded thereby enabling greater load carrying capacity while remaining within the limits of load per axle but eliminating contact between the road surface and the auxiliary tandem wheels when the truck is unloaded. Specifically, the present invention represents certain novel improvements over that type of construction shown in prior Patent No. 2,943,865, issued July 5, 1960.

It is desirable to utilize a greater number of axle and wheel assemblies for distributing the load more evenly and contacting the ground surface at a greater number of points. This enables a greater load to be carried on the truck without violating those ordinances which limit the load per axle. Further, this enables a greater load to be carried without excessive weight being carried by the pneumatically inflated tires. Therefore, it is the primary object of the present invention to provide an atachment for truck beds which pivotally supports an auxiliary tandem axle in such a manner that the wheel assemblies carried at each end of the tandem axle along with the tandem axle will be elevated when the truck bed is unloaded and is disposed at its uppermost position with the auxiliary tandem axle and wheel assemblies thereon being lowered into contact with the ground surface as the truck bed lowers when it receives a load thereby rendering the raising and lowering of the auxiliary wheel assemblies responsive to the loading and unloading of the truck bed.

The attachment of the present invention generally includes a support beam pivotally supported intermediate its ends from the truck bed. One end of the beam is swivelly attached to the axle housing or other appropriate component of the existing driving axle assembly. The other end of the beam supports the auxiliary tandem axle whereby movement of the truck bed vertically will cause the central portion of the beam to move vertically then swing about an axis defined by the driving axle assembly thus raising and lowering the auxiliary tandem axle assembly in response to loading and unloading of the truck bed. The inter-relationship of parts is such that the auxiliary wheel assemblies on each end of the auxiliary tandem axle will be disposed off of the ground surface when the truck is unloaded. The elevation of the auxiliary wheels above the ground surface eliminates the drag on the truck caused by friction in the auxiliary wheel assemblies and also eliminates wear on the auxiliary tires as well as side scuffing of the tandem tire arrangement which occurs to a certain extent when the tandem wheel assemblies both are in lowered position. When the auxiliary tandem axle and wheel assemblies thereon are lowered such as when the truck bed is carrying a load, an approximately equal weight will be supported by each of the wheel assemblies under the truck bed thus improving the weight distribution characteristics and reducing the load on each wheel assembly.

A very important feature of the present invention is to provide an attachment which is lightweight but ruggedly built that is especially constructed for high speed highway hauling and transport where weight is in the prime importance and where trucks are not subjected to extreme stresses and strains under load as are off highway trucks when they travel over uneven terrain. This enables elimination of the bogey arms employed in the construction of Patent No. 2,943,865, thereby enabling a saving of 400 to 500 lbs. thus materially increasing the pay load.

A further very important object of the present invention is to provide a truck bed attachment generally in the form of a pair of supporting beams carrying auxiliary axle and wheel assemblies which is simple in construction, easy to attach to existing truck beds, efficient in operation and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the attachment of the present invention illustrating its relationship to the components of the driving axle and truck frame;

FIGURE 2 is a view similar to FIGURE 1 with portions broken away illustrating the relationship of components when the truck bed frame is loaded;

FIGURE 4 is a detailed sectional view taken substantially upon a plane passing along section line 4—4 of FIGURE 1 illustrating the details of construction of the invention;

FIGURE 5 is a detailed sectional view illustrating the manner of attaching the forward end of the beam to the axle housing.

Figure 3:
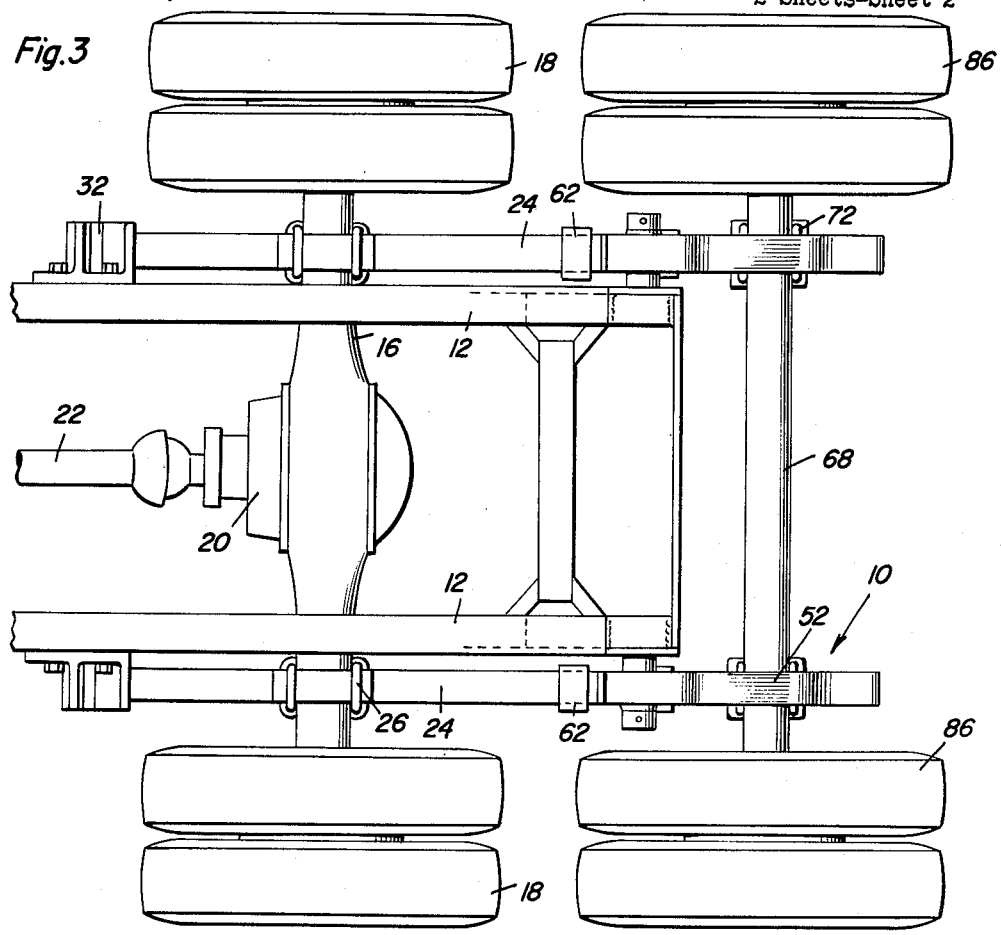
FIGURE 3 is a top plan view of the construction of FIGURE 1.

Referring now specifically to the drawings, the numeral 10 generally designates the truck bed attachment of the present invention. In FIGURES 1–5, the invention is illustrated as being attached to the rear of a truck frame 12 having the usual driving axle 14, driving axle housing 16, driving wheels 18, differential assembly 20 and drive shaft 22. For supporting the axle housing 16 from the frame 12, there is provided a pair of leaf spring assemblies 24 secured to the axle housing 16 by U-bolts 26 and clamp plates 28 and 30. All of the foregoing structure is of conventional nature as is the bracket and shackle 32 attaching the forward end of the spring assembly 24 to the frame 12. It is noted that when the frame 12 is lowered as when a load is applied thereto, the normally arcuate leaf spring assembly 24 straightens out with the unloaded condition being illustrated in FIGURE 1 and the loaded condition being illustrated in FIGURE 2.

The attachment 10 of the present invention includes an elongated hollow beam generally designated by numeral 34 which includes a forward generally horizontally disposed portion 36 having an end plate 38 rigidly secured thereto. Projecting longitudinally forwardly from the end plate 38 is a rod 40 having a transverse sleeve 42 thereon pivotally received on a transverse pin or bolt 44 carried by the legs of a bracket 46 having a forwardly extending portion 48 received between the axle housing 16 and the lower surface of the leaf spring assembly 24 thereby rigidly securing the bracket 48 to the leaf spring assembly 24 and to the axle housing 16. The beam 34 may swing vertically about the horizontal axis formed by the pin 44. At the rear of the horizontal portion 36, there is an upwardly curved portion 50 forming part of the beam and extending rearwardly therefrom is a rear horizontal portion 52 and a downturned terminal end portion 54. At the lower end of the upturned portion 50, there is provided a support pin 56 which extends through the beam 34 and is rigidly secured to a depending bracket 58 attached to the frame rail 12. This pivotally mounts the beam 34 onto the frame rail 12 for pivotal movement in relation thereto and a retaining member 60 is provided on the pin 56 for retaining the beam 34 pivotally thereon and preventing lateral deflection thereof.

Immediately forwardly of the pin 56 and spaced longitudinally therefrom, the beam 34 is provided with an inverted U-shaped strap 62 secured thereto as by welding 64 or the like. The bight portion on the strap is disposed over the rear end of the leaf spring assembly 24. The uppermost leaf of the leaf spring assembly 24 is provided with an upturned end portion 66 which eliminates complete disengagement of the spring assembly 24 in relation to the inverted U-shaped bracket 62.

This arrangement provides for a binding or resilient engagement between the components of the invention to prevent them from bouncing or becoming loose when the truck bed is unloaded.

Supported from the rear portion of the beam 34 is an auxiliary axle 68 having a leaf spring assembly 70 connected thereto by virtue of U-bolts 72 and clamping plates 74. The forward end of the leaf spring assembly 70 is pivotally attached to the beam 34 by a transverse pin or shackle 78 while the rear end of the leaf spring assembly 70 is received between an inwardly extending flange 80 on the beam 34 and a clamp bolt 82 extending through the bottom flange 84 on the beam 34. Thus, the rear end of each beam 34 carries an auxiliary tandem axle assembly 68 and each end of the tandem axle 68 carries a wheel assembly 86 thereon for engagement with the road surface when the truck bed is loaded or spaced vertically therefrom when the truck bed is unloaded as illustrated in the two positions of FIGURES 1 and 2.

Figure 6:
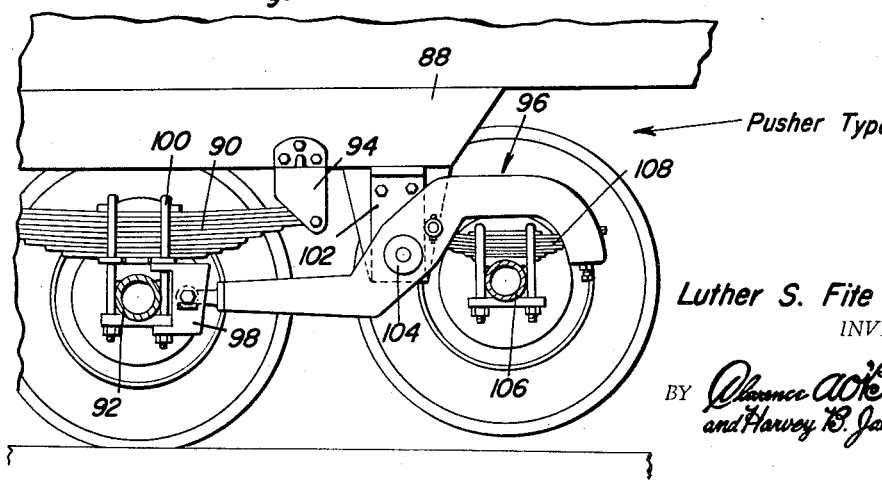
FIGURE 6 is a side elevational view illustrating a similar assembly attached to a trailer in which the auxiliary axle is disposed forwardly of the normal trailer axle.

The construction illustrated in FIGURE 6 is equivalent to that employed in FIGURES 1–5 except that this form of the invention is disclosed as being on the trailer bed or frame 88 rather than on the truck frame 12 and the details of the invention are somewhat the same. However, in this form of the invention, the leaf spring supporting assembly 90 for the existing axle 92 is attached at its forward end by a conventional bracket and shackle assembly 94 and there is no connection between the beam 96 and the spring assembly 90 on the existing structure. The beam 96 is attached to a bracket 98 attached to one of the U-shaped bolts 100 in any suitable manner so that the beam 96 may swing in a vertical plane. Also, the beam 96 is centrally supported from a bracket 102 depending from the frame rail 88 with the beam 96 being retained in position on the pin by the retaining plate 104. The forwardly spaced auxiliary tandem axle 106 is supported by leaf spring assembly 108 on the beam 96 in the same manner as in the form of the invention illustrated in FIGURES 1–5.

This form of the invention may be considered a pusher type in that the auxiliary axle and wheel assembly on each end thereof is disposed forwardly of the existing and conventional axle assembly and the entire structure is disposed below and generally in the plane of the frame rail 88 rather than alongside thereof as in FIGURES 1–5. This form of the invention operates in substantially the same manner as that form of the invention illustrated in FIGURES 1–5 in that vertical movement of the frame rail 88, bracket 102 and pivot point 104 for the beam 96 will cause upward and downward swinging movement of the auxiliary tandem axle 106 for engaging the wheel assemblies on each end of the auxiliary axle with the ground surface when the trailer is loaded and disengaging the wheel assemblies on the auxiliary tandem axle from the ground surface when the trailer is unloaded thereby saving tire wear, reducing drag, increasing the load carrying capacity and generally increasing the efficiency of the operation of the truck unit.

Basically, the present invention doubles the number of wheel assemblies engaging the ground surface when the truck is loaded as far as load carrying wheels are concerned as compared to the assembly when the truck is unloaded.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A truck bed attachment for distributing the weight of a loaded bed over a greater number of wheels than the distributed weight of an unloaded truck bed comprising in combination with a truck frame having a resiliently suspended live axle, a rigid elongated equalizing bar pivotally supported by said truck bed, means directly connecting said bar with said live truck axle enabling said bar to swing relative to the live truck axle and causing swinging movement of the bar upon relative movement between the live truck axle and the truck bed, a dead axle disposed in spaced relation to the live truck axle, said bar supportingly engaging the dead axle at a point remote from the live truck axle and forming the sole means for support of the dead axle, said resilient suspension associated with said live axle being of sufficient strength to raise the truck bed when in unloaded condition relative to said live axle whereby said pivotal connection between the bar and the truck bed will be elevated thereby raising the dead axle relative to said live axle, the resilient suspension for the live axle including a leaf spring assembly, the rear end of the leaf spring assembly being connected with the equalizing bar intermediate the points of connection between the equalizing bar and the truck bed and between the equalizing bar and the live axle.

2. The structure as defined in claim 1 wherein said equalizing bar is provided with an inverted U-shaped bracket receiving one end of the spring assembly for the live axle, said end of the spring assembly of the lixe axle having an upturned end for retaining it in engagement with the bracket carried by the equalizing bar.

3. A truck bed attachment for distributing the weight of a loaded bed over a greater number of wheels than the distributed weight of an unloaded truck bed comprising in combination with a truck frame having a resiliently suspended live axle, a rigid elongated equalizing bar pivotally supported by said truck bed, means directly connecting said bar with said live truck axle enabling said bar to swing relative to the live truck axle and causing swinging movement of the bar upon relative movement between the live truck axle and the truck bed, a dead axle disposed in spaced relation to the live truck axle, said bar supportingly engaging the dead axle at a point remote from the live truck axle and forming the sole means for support of the dead axle, said resilient suspension associated with said live axle being of sufficient strength to raise the truck bed when in unloaded condition relative to said live axle whereby said pivotal connection between the bar and the truck bed will be elevtaed thereby raising the dead axle relative to said live axle, said means directly connecting said bar with said live truck axle comprising a transverse pin and sleeve combination, said pin projecting horizontally from a bracket rigidly disposed between the live axle and the resilient suspension thereof, said sleeve being an integral part of the bar thereby insuring that the position of the connection of the bar with the live truck axle be fixed relaitve to the live truck axle.

4. A truck bed attachment for distributing the weight of a loaded bed over a greater number of wheels than the distributed weight of an unloaded truck bed comprising in combination with a truck frame having a resiliently suspended live axle, a rigid elongated equalizing bar pivotally supported by said truck bed, means directly connecting said bar with said live truck axle enabling said bar to swing relative to the live truck axle and causing swinging movement of the bar upon relative movement between the live truck axle and the truck bed, a dead axle disposed in spaced relation to the live truck axle, said bar supportingly engaging the dead axle at a point remote from the live truck axle and forming the sole means for support of the dead axle, said resilient suspension associated with said live axle being of sufficient strength to raise the truck bed when in unloaded condition relative to said live axle whereby said pivotal connection between the bar and the truck bed will be elevated thereby raising the dead axle relative to said live axle, said equalizing bar being provided with one end vertically offset in relation to the other end, said end of the equalizing bar supporting the dead axle being disposed above the other end of the equalizing bar and being of substantially U-shaped configuration, said dead axle including a leaf spring assembly having one end thereof connected to the equalizing bar by a pivotal connection and the other end being movably supported on the squalizing bar for permitting flexure of the leaf spring assembly, said resilient suspension for the live axle including a leaf spring assembly, the rear end of the leaf spring assembly being connected with the equalizing bar intermediate the points of connection between the equalizing bar and the truck bed and the equalizing bar and the live axle.

References Cited in the file of this patent

UNITED STATES PATENTS

| | | | |
|---|---|---|---|
| 1,480,279 | MacLachlan | _____ | Jan. 8, 1924 |
| 2,391,948 | Couse | _____ | Jan. 1, 1946 |
| 2,934,351 | Masser | _____ | Apr. 26, 1960 |
| 2,943,865 | Fite | _____ | July 5, 1960 |